United States Patent
Hartig et al.

[19]

[11] Patent Number: 6,059,909
[45] Date of Patent: May 9, 2000

[54] NEUTRAL, HIGH VISIBLE, DURABLE LOW-E GLASS COATING SYSTEM, INSULATING GLASS UNITS MADE THEREFROM, AND METHODS OF MAKING SAME

[75] Inventors: Klaus W. Hartig, Brighton; Steve L. Larson, Monroe; Philip J. Lingle, Temperance, all of Mich.

[73] Assignee: Guardian Industries Corp., Auburn Hills, Mich.

[21] Appl. No.: 09/030,361

[22] Filed: Feb. 25, 1998

Related U.S. Application Data

[60] Division of application No. 08/611,457, Mar. 22, 1996, Pat. No. 5,770,321, which is a continuation-in-part of application No. 08/552,366, Nov. 2, 1995, abandoned.

[51] Int. Cl.[7] .............................. C03C 27/06; E06B 3/66
[52] U.S. Cl. ........................................ 156/109; 204/192.26
[58] Field of Search ............................ 428/622, 623, 428/627, 630, 632, 666, 673, 680, 34, 46; 52/786.1; 156/109, 292; 65/58; 204/192.26, 192.27, 192.28, 192.29

[56] References Cited

U.S. PATENT DOCUMENTS

| | | | |
|---|---|---|---|
| 3,272,986 | 9/1966 | Schmidt | 250/86 |
| 3,649,359 | 3/1972 | Apfel et al. | 117/33.3 |
| 3,682,528 | 8/1972 | Apfel et al. | 350/1 |
| 3,698,946 | 10/1972 | Kaspaul et al. | 427/255 |
| 3,846,152 | 11/1974 | Franz | 117/33.3 |

(List continued on next page.)

FOREIGN PATENT DOCUMENTS

| | | |
|---|---|---|
| 031278 | 12/1980 | European Pat. Off. |
| 0080182 | 6/1983 | European Pat. Off. |
| 2027223 | 2/1980 | United Kingdom |
| 9005439 | 5/1990 | WIPO |

OTHER PUBLICATIONS

Knittl, Zdenek "Optics of Thin Films", John Wiley & Sons Ltd., London, (no month) 1976, p. 284.

Airco Coating Technology, Super–E III, Jan. 1991, p. 122 (Redacted Form—Full Form in Sealed Envelope Accompanying Petition to Expunge).

ASTM E–308–85 "Standard Method for Computing the Colors of Objects by Using the CIE System", Feb. 22, 1985.

Airco Coating Technology, Super–E IV (1994?), pp. 1–23, (no date) (Redacted Form—Full Form in Sealed Envelope Accompanying Petition to Expunge).

ASTM E424–71 "Standard Test Methods for Solar Energy Transmittance and Reflectance (Terrestrial) of Sheet Materials", Apr. 15, 1971.

1991 Proposed ASTM Standard (Primary Glass Manufacturer's Council) for Measurement of Infrared Energy (2,500–40,000 nm) To Calculate Emittance, Nov. 8, 1991.

Viracon, Solarscreen 2,000™ New Product Bulletin (4 pages), Apr. 1994.

Viracon, Solarscreen 2,000 on Tinted Substrates (1 page), Apr. 1994.

Window 4.1 LBL–35298 (Mar. 1994).

NFRC 100–91 Procedure for Determining Fenestration Product Thermal Properties (Currently Limited to U–Values) no month (1991).

(List continued on next page.)

*Primary Examiner*—John J. Zimmerman
*Attorney, Agent, or Firm*—Hall, Priddy & Myers

[57] ABSTRACT

A sputter-coated layer system on a glass substrate particularly useful in insulating glass (IG) units, enables normal emissivity values ($E_n$) of 0.06 or less, good durability and neutral color. The layer system includes an undercoat of a transparent dielectric having an index of refraction between 2.5–2.6 at a wavelength of 550 nanometers, two layers of $Si_3N_4$, and two layers of nichrome sandwiching a layer of silver to achieve its unique low-E, neutral color, non-mirrorlike solar management properties. An optional overcoat of a transparent dielectric material having an index of refraction of 2 at a wavelength of 550 nanometers may be provided.

4 Claims, 2 Drawing Sheets

U.S. PATENT DOCUMENTS

| | | | |
|---|---|---|---|
| 3,889,026 | 6/1975 | Groth | 428/34 |
| 3,900,673 | 8/1975 | Mattimoe et al. | 428/339 |
| 3,901,997 | 8/1975 | Groth | 428/428 |
| 3,962,488 | 6/1976 | Gillery | 427/104 |
| 3,978,273 | 8/1976 | Groth | 428/434 |
| 3,990,784 | 11/1976 | Gelber | 350/166 |
| 4,179,181 | 12/1979 | Chang | 350/17 |
| 4,204,942 | 5/1980 | Chashroudi | 204/298 |
| 4,335,166 | 6/1982 | Lizardo et al. | 428/34 |
| 4,337,990 | 7/1982 | Fan et al. | 350/1.7 |
| 4,356,073 | 10/1982 | McKelvey | 204/192 R |
| 4,422,916 | 12/1983 | McKelvey | 204/192 R |
| 4,462,883 | 7/1984 | Hart | 204/192 C |
| 4,488,775 | 12/1984 | Yamamoto | 350/164 |
| 4,534,841 | 8/1985 | Hartig et al. | 428/436 |
| 4,548,691 | 10/1985 | Dietrich | 204/192 P |
| 4,556,277 | 12/1985 | Fan et al. | 350/1.7 |
| 4,639,069 | 1/1987 | Yatabe et al. | 350/1.7 |
| 4,716,086 | 12/1987 | Gillery et al. | 428/630 |
| 4,780,372 | 10/1988 | Tracy et al. | 428/428 |
| 4,786,784 | 11/1988 | Nikodem et al. | 219/543 |
| 4,799,745 | 1/1989 | Meyer et al. | 350/1.7 |
| 4,943,484 | 7/1990 | Goodman | 428/441 |
| 5,011,745 | 4/1991 | Dietrich et al. | 428/630 |
| 5,229,194 | 7/1993 | Hartig et al. | |
| 5,279,722 | 1/1994 | Szczyrbowski et al. | 204/192.27 |
| 5,296,302 | 3/1994 | O'Shanghassy et al. | 428/472 |
| 5,302,449 | 4/1994 | Eby et al. | 428/336 |
| 5,318,685 | 6/1994 | O'Shanghassy et al. | 204/192.27 |
| 5,332,888 | 7/1994 | Tausch et al. | 219/547 |
| 5,344,718 | 9/1994 | Hartig et al. | 428/436 |
| 5,376,455 | 12/1994 | Hartig et al. | 428/627 |
| 5,377,045 | 12/1994 | Wolfe et al. | 359/585 |
| 5,425,861 | 6/1995 | Hartig et al. | 204/192.26 |
| 5,514,476 | 5/1996 | Hartig et al. | 428/623 |
| 5,557,462 | 9/1996 | Hartig et al. | 359/585 |
| 5,563,734 | 10/1996 | Wolfe et al. | 359/360 |
| 5,584,902 | 12/1996 | Hartig et al. | 65/32.4 |
| B1 4,799,745 | 1/1992 | Meyer et al. | 350/1.7 |

OTHER PUBLICATIONS

NFRC 301–93 "Standard Test Method for Emittance of Specular Surfaces Using Spectrometric Measurements" (Jan. 1993).

NFRC 200–93: "Procedure For Determining Fenestration Product Solar Heat Gain Coefficients at Normal Incidence" (Jan. 1993).

ASTM D2244–93 "Standard Test Method for Calculation of Color Differences From Instrumentally Measured Color Coordinates" Sep. 15, 1993.

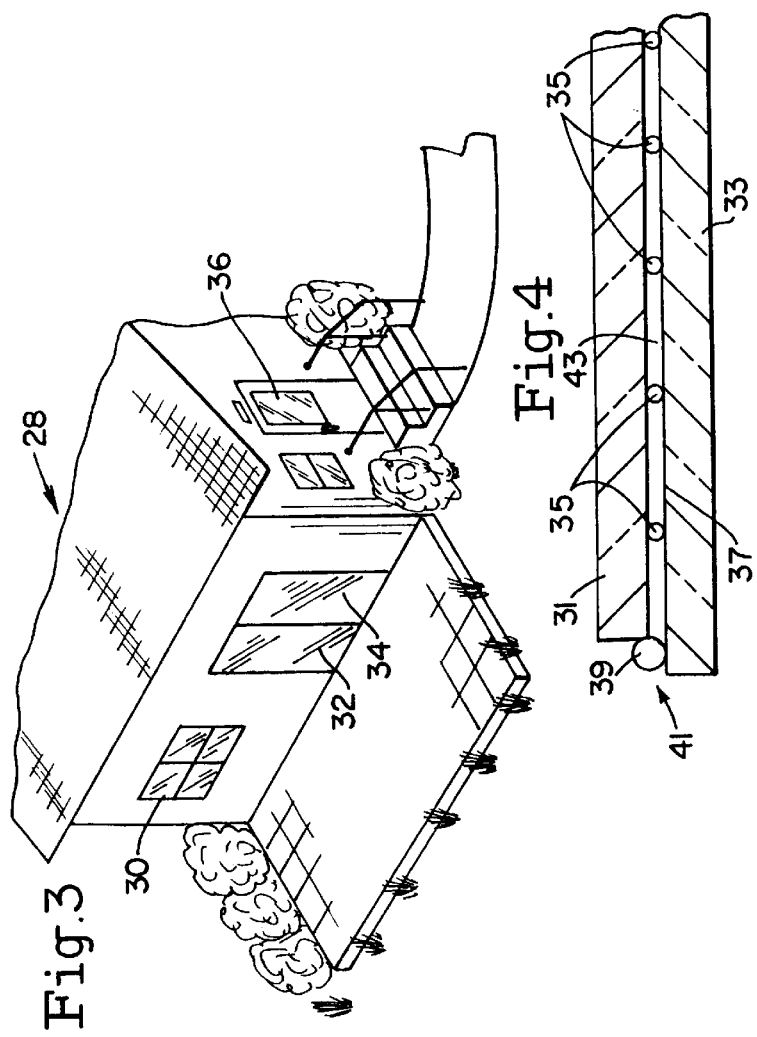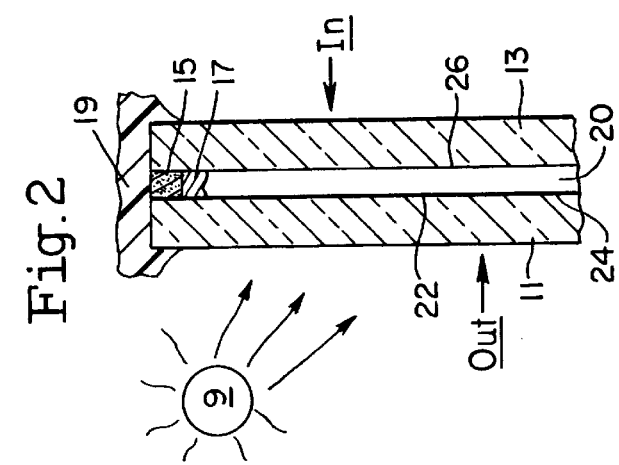

NEUTRAL, HIGH VISIBLE, DURABLE LOW-E GLASS COATING SYSTEM, INSULATING GLASS UNITS MADE THEREFROM, AND METHODS OF MAKING SAME

CROSS REFERENCE TO RELATED APPLICATION

This application is a divisional of Ser. No. 08/611,457 filed Mar. 22, 1996 and now U.S. Pat. No. 5,770,321, and which is a continuation-in-part of our application Ser. No. 08/552,366 filed Nov. 2, 1995 now abandoned.

FIELD OF THE INVENTION

This invention relates to coating systems for glass substrates which exhibit very low emissivity values and are substantially neutral in color. More particularly, this invention relates to glass articles, such as insulating glass units (e.g. doors and windows) which are provided with these coating systems, and methods of making them.

BACKGROUND OF THE INVENTION

The importance of sputter-coated glass layer systems for achieving solar management properties in many types of glass articles, such as architectural windows and doors, is now well established in commerce. In addition, the importance of using such layer systems in insulating glass units (known as "IG" units in the art) is equally well established. Examples of this latter use include multipaned windows and doors made up of at least two panes of glass sealed at their peripheral edges to form an insulating chamber therebetween. Such chambers, in this respect, are often made by evacuating the air from the chamber, heat sealing the glass panes at their edges and filling the chamber formed with a gas other than air, such as argon.

Important to the acceptance of solar management glasses, including IG units, in the marketplace are the following characteristics which relate directly to the sputter-coated layer system employed:

1) the desired amount of visible transmittance coupled with an acceptable level of infrared radiation reflectance;

2) a non-mirror-like appearance (i.e. a low visible "reflectance" as defined below);

3) a substantially neutral visible reflected color when viewed from the glass side (i.e. a color falling within the range of from colorless to slightly blue);

4) resistance to weathering or other chemical attack, often referred to as "chemical durability" (this term is defined below); and 5) resistance to abrasion (often referred to as "mechanical durability", a term also defined below) during handling, particularly during the various steps necessary to produce an IG window or door from two or more sheets of glass, at least one of which has been pre-sputter-coated with the aforesaid layer system.

In addition to these physical characteristics, the coating system employed must be economical to produce. If it is not, the ultimate product, such as in an IG unit, may become so expensive as to inhibit demand.

It is well-known in the art that these desired characteristics often conflict when attempting to achieve them, and that, therefore, trade-offs often become necessary. For example, achievement of acceptable levels of transmittance or IR (infrared) reflection may have to be at the expense of durability (either chemical or mechanical, or both). In other trade-offs, undesirable colors and mirror-like windows (or doors) become unavoidable. In still further trade-offs, cost of production becomes a significant factor. Such problems create a need in the art for a new sputter-coated layer system which can achieve a better balance among these characteristics.

In U.S. Pat. No. 5,344,718 there are disclosed various excellent sputter-coated layer systems which achieve acceptably low values of emissivity (E), and thus are properly classified as a family of "Low-E" systems (i.e. a family of high IR reflectance coatings). In addition, such coating systems, as a family, generally exhibit durability characteristics which approach or equal those of pyrolytic coatings and thus are quite acceptable. Still further, these coatings, particularly in their preferred embodiments, exhibit high visible transmittance. At the same time they also exhibit a reasonably neutral color, ranging somewhat into the green side of blue which is, however, reasonably masked by the level of visible reflectance achieved to thereby appear substantially neutral. In addition, these visible reflectance characteristics are below 20% and thus also avoid an undesirable mirror-like appearance when viewed from either the inside or outside when used, for example, as a window or door.

The family of layer systems disclosed in U.S. Pat. No. 5,344,718 employs various layers of $Si_3N_4$ and nickel or nichrome to sandwich one or more layers of IR reflecting metallic silver between them, in a selected order, thereby to achieve the desired end properties. The entire disclosure of this patent, including the "BACKGROUND" section thereof is incorporated herein by reference.

Generally speaking this prior patent ('718) achieves its unique results by the use of a system comprised of five or more layers wherein from the glass outwardly the system comprises:

a) an undercoat layer of $Si_3N_4$;

b) a layer of nickel or nichrome;

c) a layer of silver;

d) a layer of nickel or nichrome; and e) an overcoat layer of $Si_3N_4$.

When the system consists essentially of these five (5) layers, the following thicknesses are generally employed:

| Layer | Range (approx.) |
| --- | --- |
| a ($Si_3N_4$) | 400Å–425Å |
| b (Ni or Ni:Cr) | 7Å or less |
| c (Ag) | 95Å–105Å |
| d (Ni or Ni:Cr) | 7Å or less |
| e ($Si_3N_4$) | 525Å–575Å |

When, in this prior patent ('718), more than five layers are employed, such as when two silver layers are employed, the system from the glass outwardly usually includes the following layers:

glass/$Si_3N_4$/Ni:Cr/Ag/Ni:Cr/Ag/Ni:Cr/$Si_3N_4$, and the total thickness of the silver remains the same (e.g. 95 Å–105 Å) such that each layer of silver itself is only about 50 Å, to make up the total.

While such systems as disclosed in this prior '718 patent constitute a significant improvement over then existing prior art systems, particularly those discussed in the "BACKGROUND" section of that patent; nevertheless, there remained room for improvement in the characteristic of "emissivity". For example, in the systems of the '718 patent, normal emissivity ($E_n$) was generally less than or equal to about 0.12 while hemispherical emissivity ($E_h$) was generally less than about 0.16. However, in practice, the lower limits realistically or commercially achievable were generally, for $E_n$ about 0.09 and for $E_h$ were about 0.12. Achievable sheet resistances ($R_s$) in this respect were generally from about 9–10 ohms/$_{sq.}$ Inhibiting the achievement of better IR reflection (i.e. decreased "E" values) was the generally held belief that if the thickness of silver were increased to achieve higher IR reflectance (and thus lower "E" values) at least one or more of the following four detrimental effects would occur: (1) there would result a loss of durability; (2) the ultimate product would be too highly reflective, and thus become mirror-like; (3) the color would be driven to an unacceptably high purple or red/blue appearance; and/or (4) visible transmittance would become unacceptably low.

Durability, both mechanical and chemical, is an important factor to achieve in architectural glass generally whether used as a monolithic sheet or, for example, when used in an IG unit. As aforesaid, the handling, assembling and sealing of IG units places a premium on mechanical durability, while the need to edge seal the panes to create an insulating chamber therebetween creates the need for chemical durability due primarily to the nature of the sealant which inevitably contacts the coating. Aesthetically, both mirror-like and purple color qualities may eliminate the marketability of any product exhibiting these characteristics. Loss of visible transmittance while undesirable, does not become truly objectionable until, in a monolithic sheet, it drops below about 70% and in an IG unit it drops below about 63%. However, in certain uses, particularly where low shading coefficients (i.e. less than about 0.6) are desired, transmittance may actually be too high, even though emissivity is reasonably low. Generally speaking, where shading qualities are desired (i.e. to lower air conditioning costs), monolithic visible transmittance should be kept below 75% and preferably below 73%, while in a typical IG unit visible transmittance should be about 65% to 68%.

In partial confirmation of the above beliefs, is the rather complex layer system disclosed in U.S. Pat. No. 5,302,449 as well as its presumed commercial counterpart in IG unit form, known as Cardinal 171 sold by Cardinal IG Company. The layer system as taught in this patent varies the thicknesses and types of materials in the layer stack to achieve certain solar management qualities, as well as employing an overcoat of an oxide of zinc, tin, indium, bismuth, or oxides of their alloys including the oxide of zinc stannate, to achieve abrasion resistance. In addition, the system employs one or two layers of gold, copper or silver to achieve its end results. When two layers of silver are used it is said that the first is between 100 Å–150 Å and preferably about 125 Å in thickness while the second, based thereon, is to be between 125 Å–175 Å. When only one silver layer is employed, it is taught that its thickness is to be about 100 Å–175 Å, and preferably 140 Å. Nowhere does this patent disclose the use of nickel or nichrome, nor the use of silicon nitride as an element(s) in the stack arrangement.

In actual commercial practice, the aforesaid Cardinal IG units have been found to achieve quite acceptable solar management properties including acceptable color characteristics and relatively good non-mirror-like visible reflectance (an example is reported hereinbelow for comparison). However, this otherwise quite acceptable system has been found lacking in chemical durability, and, as defined herein, may be said to lack chemical durability since it fails the prescribed boil test. While the precise reason for this is not known, the simple conclusion is that, as has been indicative of the prior art, sacrifices had to be made in at least one desirable characteristic, in order to achieve desirable levels of the others. In addition, due to the nature of the stack and elements used, the system is quite expensive to produce principally due to the number and thickness of the layers required to achieve the desired result.

In the "BACKGROUND" section of the aforesaid '718 patent there is disclosed a further prior art architectural glass layer system which commercially has become known as Super-E III, a product of the Airco Corporation. This system, from the glass outwardly consists of the following layer stack:

$Si_3N_4/Ni:Cr/Ag/Ni:Cr/Si_3N_4$

It has been found in practice that in this Super-E III system the Ni:Cr alloy is 80/20 by weight Ni/Cr, respectively (i.e. nichrome), the two nichrome layers are reported as being 7 Å thick, the Ag layer is specified as being only about 70 Å thick [except that it is stated that the silver may be about 100 Å thick], and the $Si_3N_4$ layers are relatively thicker (e.g. 320 Å for the undercoat and about 450 Å for the overcoat). In reality, because of its thinness (i.e. about 70 Å), the silver (Ag) layer has been found, in practice, to actually be rather semi-continuous in nature.

While this coating achieved good "durability" (i.e. the coating was scratch resistant, wear resistant and chemically stable) and thus achieved an important measure of this characteristic as compared to pyrolytic coatings, for glass at about 3 mm thick, $E_h$ is only about 0.20–0.22, and $E_n$ is about 0.14–0.17. Both of these emissivity values are rather high. In addition, sheet resistance ($R_s$) measures a relatively high 15.8 ohms/$_{sq.}$ (the more acceptable value being about 10.5 or less). Thus, while both mechanical and chemical durability are found to be quite acceptable and its monolithic sheet visible transmittance was a rather high 76±1%, and while these coatings also proved to be compatible with conventional sealants used in IG units, its ability to handle IR radiation was less than desirable. In addition, its rather high monolithic visible transmittance of 76±1% made such a system rather undesirable when lower shading characteristics were required.

Airco has followed its Super-E III system with what it has designated as its Super-E IV system. This system includes as its layer stack from the glass outwardly the following:

| Element | Thickness (Å) |
| --- | --- |
| $TiO_2$ | Approx. 300 |
| $NiCrN_x$ | Approx. 8 |
| Ag | Approx. 105 |
| $NiCrN_x$ | Approx. 8 |
| $Si_3N_4$ | Approx. 425 |

This system is quite similar in performance to the Super-E III except that visible transmittance is higher (e.g. greater than 80%), emittance is lower (e.g. less than about 0.10) and shading coefficient is significantly higher (e.g. approx. 0.80). While this Super-E IV system employs an undercoat of $TiO_2$ there is no teaching or recognition when carrying out this system in practice that if the index of refraction of the undercoat of $TiO_2$ were carefully controlled within certain rather narrow limits, that certain very important improved results could be achieved. Instead, it was left to our invention herein described to discover this unique phenomenon and the unexpected characteristics resulting therefrom.

Another layer system, somewhat similar perhaps to Super-E III and IV, is reported in U.S. Pat. No. 5,377,045.

In the systems therein reported, a single silver layer (for example) is sandwiched between two nichrome layers which, in turn, are sandwiched between a lower layer of, for example, $TiO_2$ or $Si_3N_4$ doped with Zr; and an outer layer of $Si_3N_4$ or $Si_3N_4$ doped with Zr. The use of $TiO_2$ as an undercoat with a contiguous layer of $Si_3N_4$ (doped or undoped) is not disclosed. In addition, the index of refraction of the undercoat layer is specified only generically as "greater than about 2.0 and most preferably between 2.4 and 2.7" [Col. 2, lines 63–64].

The designations of index of refraction disclosed in this patent indicate patentees' adoption of the conventional practice of reference to 550 nanometers as the wavelength, which we also use herein to describe our invention. However, in this patent there is no specified index for $TiO_2$ and when the patentees specify the use of doped $Si_3N_4$ as the undercoat, the index of refraction is said to be between 2.00–2.45, below the limits of index found useful in the practice of our invention. There is, furthermore, no disclosure or recognition in this patent that the index of refraction of $TiO_2$ may be carefully controlled during the sputtering process by control of the oxygen content in the sputter zone as we do in the practice of our invention. Still further, in the most preferred embodiments of our invention, a significant increase in silver layer thickness is achieved over that reported in this patent. The patent reports a maximum thickness of 150 Å, with 90 Å–110 Å being preferred. In contrast, our invention's most preferred range is above 150 Å, and preferably about 165 Å, enabling the achievement of significantly lower emissivity values.

The layer systems of this patent, in practice, are known to generally be of a purple color, have been found not to be chemically durable as defined by the below-described boil test, are not heat treatable, and have a rather high emissivity. According to this patent, in this respect, special sputtering techniques are said to be needed in order to reduce what is referred to as the "intrinsic stress" in one of the dielectric layers in order to achieve mechanical and chemical desirability according to the tests reported therein used to define these two characteristics.

A significant improvement in the prior art is disclosed in our application Ser. No. 08/356,515 filed Dec. 15, 1994, now U.S. Pat. No. 5,514,476, and entitled LOW-E GLASS COATING SYSTEM AND INSULATING GLASS UNITS MADE THEREFROM. The disclosure of this application is incorporated herein by reference. In this pending application there is disclosed a unique layer system comprised of a silver layer sandwiched between two nichrome layers which, in turn, are sandwiched between a lower and outer layer of $Si_3N_4$. By appropriate adjustment of layer thicknesses, the coating systems of that invention achieved advantageously low emissivities (i.e. $E_n < 0.7$, $E_h < 0.075$, $R_s < 5.5$ ohms/$_{sq.}$). In addition, the reflectance characteristics (reflectance and extinction) made them quite acceptable (i.e. no mirrorlike appearance) for use in insulating glass units ("IG's"). The transmittance characteristics, as well, were in the appropriate range and the problem of undesirable purple color of past prior art systems was eliminated.

While these layer systems were quite advantageous, it has been found that as one seeks to achieve even lower emissivity values (i.e. reduced infrared transmission, which is a principal object of many layer systems used in architectural and automotive glass), principally through the attempt to thicken the silver layer (the primary IR-reflecting layer), visible transmittance, color, and reflectance characteristics are adversely affected. For example, thickening of the silver layer has been found to severely decrease visible transmittance to below the acceptable 70% level. In addition, the glass side appearance of an article (e.g. IG unit) so coated with too thick a silver layer can often become highly purple and mirrorlike. Thus while the above system described in our aforesaid co-pending application achieved properties theretofore unachieved in combination by the prior art, there was still a need for improvement, if at all possible.

In addition to the layer systems described above, other coatings containing silver and/or Ni:Cr as layers for infrared reflectance and other light management purposes have been reported in the patent and scientific literature. See, for example, the Fabry-Perot filters and other prior art coatings and techniques disclosed in U.S. Pat. Nos. 3,682,528 and 4,799,745 (and the prior art discussed and/or cited therein). See also the dielectric, metal sandwiches created in numerous patents including, for example, U.S. Pat. Nos. 4,179,181; 3,698,946; 3,978,273; 3,901,997; and 3,889,026 just to name a few. While such other coatings have been known or reported, it is believed that prior to our invention, none of these prior art disclosures teach or have achieved the ability to employ the highly productive sputter-coating process and, at the same time, achieve an architectural glass which not only approaches or equals the durability of pyrolytic coatings, but which also achieves excellent solar management qualities as well.

A significant improvement over the previously discussed prior art layer systems is disclosed in our parent, co-pending application Ser. No. 08/552,366 filed Nov. 2, 1995 and entitled NEUTRAL, HIGH PERFORMANCE, DURABLE LOW-E GLASS COATING SYSTEM, INSULATING GLASS UNITS MADE THEREFROM, AND METHOD OF MAKING SAME. The disclosure of this application is incorporated herein by reference.

In this co-pending application there is disclosed a unique sputter-coated layer system which from the glass substrate outwardly includes:

a) a layer comprised of $Si_3N_4$ and stainless steel, wherein the stainless steel is in an amount of about 0.5%–15% by weight of said layer;

b) a layer of nickel or nichrome;

c) a layer of silver;

d) a layer of nickel or nichrome; and e) a layer comprised of $Si_3N_4$ and stainless steel, wherein the stainless steel is in an amount of about 0.5%–15% by weight of said layer, wherein when the glass substrate has a thickness of about 2 mm–6 mm, the coated glass substrate has a normal emissivity ($E_n$) of about 0.06 or less, a hemispherical emissivity ($E_h$) of about 0.07 or less, a sheet resistance ($R_s$) of about 5.0 ohms/$_{sq.}$ or less and has a substantially neutral visible reflected color when viewed from the glass side.

In certain embodiments disclosed in this co-pending application the layer system consists essentially of the above-described five (5) layers. In certain other embodiments so disclosed the layer system includes an optional undercoat of $TiO_2$. In both such embodiments, the relative thicknesses of the layers may be adjusted so that in certain further embodiments the layer system is "heat treatable" as defined therein, and as similarly defined hereinbelow.

These layer systems when so formed on their appropriate glass substrates provide unique and advantageous coated glass sheets whose solar management, durability, and chemical resistance properties (including reflectance and color properties) make such articles particularly useful in the manufacture of insulating glass units (known as "IG" units in the art). While such layer systems did at times employ an optional undercoat of $TiO_2$, the use of stainless steel admixed with the layers of $Si_3N_4$ was previously felt to be an important aspect of the system as a whole if the desired, maximized results were to be achieved.

The use of stainless steel adds expense and a measure of complexity to the system as a whole and its manufacturing process as well. Thus, if the same advantageous results could be achieved without the use of stainless steel in the $Si_3N_4$ layers, a significant advance in the art would be achieved.

In view of the above, it is apparent that there exists a need in the art for a sputter-coated layer system which optimizes rather than unduly sacrifices on a perceived priority basis, the above-described characteristics for coated glass sheets generally, and IG units more particularly, in an economical way. It is a purpose of this invention to fulfill this and other needs in the art which will become more apparent to the skilled artisan once given the following disclosure.

SUMMARY OF THE INVENTION

This invention achieves its purposes through the unexpected discovery that by carefully controlling the index of refraction of an undercoat layer of an appropriate transparent dielectric material (e.g. $TiO_2$, $Bi_2O_3$, PbO, or mixtures thereof) located below the first $Si_3N_4$ layer in the layer system of our aforesaid parent application, the use of stainless steel may be eliminated and yet the same advantageous properties achieved, such as the continued achievement of unexpectedly low emissivity levels, the visible reflectance and color appearance of the article when viewed from the glass side remaining non-mirrorlike and substantially neutral (i.e. falling within the color range of truly neutral to only slightly blue), as well as the continued achievement of chemical and mechanical durability. In addition, it has been unexpectedly found that visible transmittance is significantly improved such that the monolithic $T_{vis}$ achieved is about 75% or greater. In certain embodiments the layer systems are also heat treatable. As such, the layer systems of this invention find particular utility as layer systems in insulating glass units such as IG doors and windows, especially when such units are manufactured using heat sealing techniques.

In one aspect of this invention then there is provided a sputter-coated glass article comprised of a glass substrate having on one of its planar surfaces, from the glass outwardly, a layer system including:

a) a layer of a transparent dielectric material having an index of refraction (n) of about 2.5–2.6 as measured at a wavelength of 550 nanometers;
b) a layer of $Si_3N_4$;
c) a layer of nichrome (preferably in which at least a portion of the chromium in said nichrome is nitrided);
d) a layer of silver;
e) a layer of nichrome (preferably in which at least a portion of the chromium in said nichrome is nitrided); and
f) a layer of $Si_3N_4$;
wherein, when the glass substrate has a thickness of about 2 mm–6 mm, the coated glass substrate has a normal emissivity ($E_n$) of about 0.06 or less, a hemispherical emissivity ($E_h$) of about 0.07 or less, a sheet resistance ($R_s$) of about 5.0 ohms/$_{sq.}$ or less and has a substantially neutral visible reflected color when viewed from the glass side.

In the preferred embodiments of this invention the $Si_3N_4$ layers employed are free of stainless steel (e.g. no stainless steel is employed in the sputter-coated target material) and the visible transmittance of the aforesaid coated glass substrate is at least about 75%. However, in other embodiments, it is envisioned within the scope of this invention that stainless steel, if desired, may be employed in either or both of the $Si_3N_4$ layers in an amount up to about 0.5%–15% by weight as previously described. In still other embodiments herein envisioned, an optional overcoat above the upper $Si_3N_4$ layer, such as $SnO_2$, ZnO, $In_2O_3$, or mixtures thereof may be used either as an addition to or in place of some of the upper $Si_3N_4$ layer. However, in such instances the $Si_3N_4$ layer should be maintained at a sufficient thickness (e.g. about 50 Å or greater) to be sure that the overall desired results are not lost.

In such embodiments as described above, the relative thicknesses of the layers are adjusted so that in further preferred embodiments the layer system is "heat treatable" as this term is defined below.

In certain further embodiments of this invention a sheet of glass, provided on one of its surfaces with a layering system as above-described, is employed with at least one other sheet of glass such that each is substantially parallel to the other, but spaced therefrom and sealed at their peripheral edges to form an insulating chamber therebetween thereby to form an insulating glass unit ("IG unit") useful as a window, door or wall wherein the layer system is located on surface 24 as shown in FIG. 2 such that the reflectance and color coordinate characteristics when viewed from outside are:

$R_GY$, about 14 to 20
$a_h$, about −2 to +2
$b_h$, about 0 to −10
and when viewed from inside are:
$R_FY$, about 11 to 18
$a_h$, about 0 to +4
$b_h$, about 0 to −10
and the visible transmittance is at least about 65%. When the coating system is located on surface 26, the reflectance and color coordinates are reversed from that above, but the transmittance remains the same.

The term "outside" as used herein means as observed by a viewer from outside the dwelling in which the coated glass sheet (i.e. IG unit) is employed. The term "inside" as used herein means the opposite of "outside", i.e. the side as observed by a viewer from inside the dwelling in which the unit is placed (e.g. from within a room of a house or office building looking toward the "outside").

As stated above, it is further contemplated by this invention that certain of the layer systems that are within the scope of this invention have the characteristic of being heat treatable. As used herein, the term "heat treatable" means that a layer system is capable of being subjected to at least one of the following conventional heating processes and not have its desired end-characteristics adversely affected thereby. The conventional heating processes contemplated are tempering, bending, heat strengthening or the heat sealing step(s) employed to seal two or more glass sheets together when forming an IG unit. In this latter instance, this may or may not include heating the glass stack sufficiently high to slump the edges of the glass sheets themselves.

By having the characteristic of being heat treatable, a particular coating system of this invention may be chosen for a particular end use. For example, if the layer system is to be used in an automotive bent and/or tempered windshield, it will be one chosen so as to be capable of going through these processes. If useful in architectural windows requiring the same appearance in both untempered and tempered panes, as another example, then the coating is so chosen to achieve this result by being heat treatable via the tempering process. Of course, to be "heat treatable" the coating need only be capable of going through at least one, but not all, of the above-listed heat treatments.

In this respect, certain coatings contemplated may or may not be capable of withstanding tempering, hardening or bending, but are still considered "heat treatable" if they can withstand the heat employed to seal an IG unit during its fabrication (either with or without glass slumping), particularly when the method of forming the IG unit includes the step of evacuating the air from (i.e. degassing) the insulating chamber during sealing and leaving the chamber in vacuum or refilling it with an inert gas such as argon. Thus in certain embodiments of this invention there is fulfilled yet another need in the art by providing:

in a method of making an insulating glass unit comprised of at least two sheets of glass sealed at their peripheral edges to each other thereby to define at least one insulating chamber therebetween, the method including the steps of spacing the sheets apart, heating the sheets at an elevated temperature, and sealing the peripheral edges of the sheets to each other at or above the elevated temperature, the improvement comprising using on a planar surface of at least one of the glass sheets, a sputter-coated, heat treatable layer system according to this invention so located that the layer system is within the insulating chamber of the IG unit formed by sealing the glass sheet edges to one another.

In still another aspect of this invention there is provided a unique method for forming the sputter-coated layer systems as described above. Thus this invention includes within its scope:

A method of forming the above-described layer systems of this invention wherein the undercoat layer (a) of a transparent dielectric material is sputter-coated in an oxygen-containing environment, the steps including controlling the oxygen content in said environment when sputter-coating the undercoat layer (a) so as to obtain a sputter-coated layer (a) that has an index of refraction (n) of about 2.5–2.6.

This invention will now be described with respect to certain embodiments thereof, along with reference to the accompanying illustrations, wherein:

IN THE DRAWINGS

FIG. 2 is a partial cross-sectional view of an IG unit as contemplated by this invention;

FIG. 3 is a partial schematic perspective view of a house employing as a window, door and wall an IG unit such as illustrated in FIG. 2;

FIG. 4 is a partial cross-sectional schematized view of an embodiment of an IG unit in its pre-fabrication stage prior to evacuation and sealing as contemplated by this invention; and FIG. 5 is a schematic illustration of an Airco sputter coater apparatus which may be employed in the practice of this invention.

DETAILED DESCRIPTION OF EMBODIMENTS OF THE INVENTION

Figure 1:
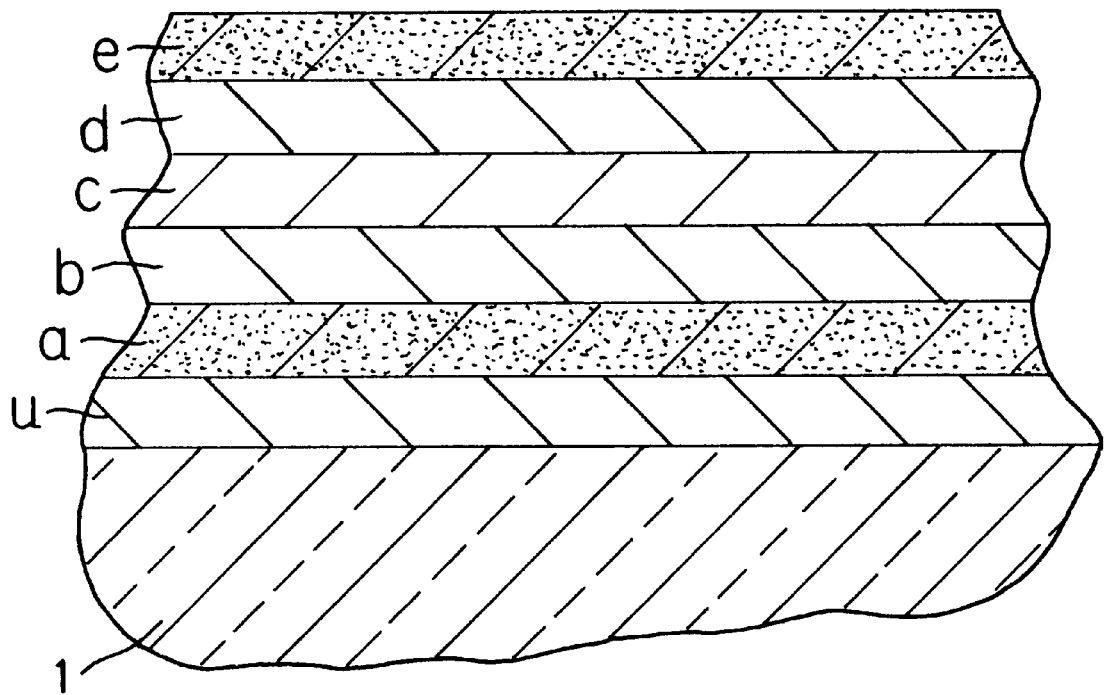
FIG. 1 is a partial side sectional view of an embodiment of a layer system according to this invention.

Certain terms are prevalently used in the glass-coating art, particularly when defining the properties and solar management characteristics of coated glass used in the architectural field. Such terms are used herein in accordance with their well-known meaning. For example, as used herein:

Intensity of visible wavelength light, "reflectance" is defined by its percentage and is reported as $R_XY$ (i.e. the Y value cited below in ASTM 308-85), wherein "X" is either "G" for glass side or "F" for film side. "Glass side" (e.g. "G") means, as viewed from the side of the glass substrate opposite that on which the coating resides, while "film side" (i.e. "IF") means, as viewed from the side of the glass substrate on which the coating resides. When reported for an IG unit the subscript "G" denotes "outside" and "F" denotes "inside" (i.e. from "outside" the dwelling, or from "inside" the dwelling, as the case may be).

Color characteristics are measured on the "a" and "b" coordinates. These coordinates are indicated herein by the subscript "h" to signify the conventional use of the Hunter method (or units) Ill. C, 10° observer, according to ASTM D-2244-93 "Standard Test Method for Calculation of Color Differences From Instrumentally Measured Color Coordinates" Sep. 15, 1993 as augmented by ASTM E-308-85, Annual Book of ASTM Standards, Vol. 06.01 "Standard Method for Computing the Colors of Objects by Using the CIE System".

The terms "emissivity" and "transmittance" are well understood in the art and are used herein according to their well-known meaning. Thus, for example, the term "transmittance" herein means solar transmittance, which is made up of visible light transmittance, infrared energy transmittance, and ultraviolet light transmittance. Total solar energy transmittance is then usually characterized as a weighted average of these other values. With respect to these transmittances, visible transmittance, as reported herein, is characterized by the standard Illuminant C technique at 380–720 nm; infrared is 800–2100 nm; ultraviolet is 300–400 nm; and total solar is 300–2100 nm. For purposes of emissivity, however, a particular infrared range (i.e. 2,500–40,000 nm) is employed, as discussed below.

Visible transmittance can be measured using known, conventional techniques. For example, by using a spectrophotometer, such as a Beckman 5240 (Beckman Sci. Inst. Corp.), a spectral curve of transmission is obtained. Visible transmission is then calculated using the aforesaid ASTM 308/2244-93 methodology. A lesser number of wavelength points may be employed than prescribed, if desired. Another technique for measuring visible transmittance is to employ a spectrometer such as a commercially available Spectragard spectrophotometer manufactured by Pacific Scientific Corporation. This device measures and reports visible transmittance directly. As reported and measured herein, visible transmittance (i.e. the Y value in the CIE tristimulus values, ASTM E-308-85) uses the Ill. C., 10° observer.

"Emissivity" (E) is a measure, or characteristic of both absorption and reflectance of light at given wavelengths. It is usually represented by the formula:

$$E = 1 - \text{Reflectance}_{film}$$

For architectural purposes, emissivity values become quite important in the so-called "mid-range", sometimes also called the "far range" of the infrared spectrum, i.e.

about 2,500–40,000 nm., for example, as specified by the WINDOW 4.1 program, LBL-35298 (1994) by Lawrence Berkley Laboratories, as referenced below. The term "emissivity" as used herein, is thus used to refer to emissivity values measured in this infrared range as specified by the 1991 Proposed ASTM Standard for measuring infrared energy to calculate emittance, as proposed by the Primary Glass Manufacturers' Council and entitled "Test Method for Measuring and Calculating Emittance of Architectural Flat Glass Products Using Radiometric Measurements". This Standard, and its provisions, are incorporated herein by reference. In this Standard, emissivity is reported as hemispherical emissivity ($E_h$) and normal emissivity ($E_n$).

The actual accumulation of data for measurement of such emissivity values is conventional and may be done by using, for example, a Beckman Model 4260 spectrophotometer with "VW" attachment (Beckman Scientific Inst. Corp.). This spectrophotometer measures reflectance versus wavelength, and from this, emissivity is calculated using the aforesaid 1991 Proposed ASTM Standard which has been incorporated herein by reference.

Another term employed herein is "sheet resistance". Sheet resistance ($R_s$) is a well-known term in the art and is used herein in accordance with its well-known meaning. Generally speaking, this term refers to the resistance in ohms for any square of a layer system on a glass substrate to an electric current passed through the layer system. Sheet resistance is an indication of how well the layer is reflecting infrared energy, and is thus often used along with emissivity as a measure of this characteristic. "Sheet resistance" is conveniently measured by using a 4-point probe ohmmeter, such as a dispensable 4-point resistivity probe with a Magnetron Instruments Corp. head, Model M-800 produced by Signatone Corp. of Santa Clara, Calif.

"Chemical durability" or "chemically durable" is used herein synonymously with the term of art "chemical resistance" or "chemical stability". Chemical durability is determined by boiling a 2"×5" sample of a coated glass substrate in about 500 cc of 5% HCl for one hour (i.e. at about 220° F.). The sample is deemed to pass this test (and thus the layer system is "chemically durable" or is deemed to have "chemical durability") if the sample's layer system shows no pinholes greater than about 0.003" in diameter after this one hour boil.

"Mechanical durability" or "mechanically durable" as used herein is defined by one of two tests. The first test uses a Pacific Scientific Abrasion Tester (or equivalent) wherein a 2"×4"×1" nylon brush is cyclically passed over the layer system in 500 cycles employing 150 gm of weight, applied to a 6"×17" sample. In the other, alternative test, a conventional Taber abrader (or equivalent) is used to subject a 4"×4" sample to 100 revolutions of two C.S. 10F abrasion wheels each having attached a 500 gm weight. In either test, if no substantial, noticeable scratches appear when viewed with the naked eye under visible light, the test is deemed passed, and the article is said to be mechanically durable.

Thicknesses of the various layers in the systems reported are measured by, and thus the term, "thickness" as used herein is defined by alternative techniques. In one technique, known optical curves, or, in the alternative, the use of a conventional needle ellipsometer (i.e. profilometer) is employed. In another and particularly advantageous technique, an "n & k" analyzer is used (n & k Technology, Inc., Santa Clara, Calif.). This technique is believed to be generally described in U.S. Pat. No. 4,905,170, along with the ability to determine the "n" (i.e. refractive index) and "k" (i.e. the coefficient of extinction) values of the film under investigation. The disclosure of this patent is incorporated herein by reference. Such procedures and techniques are well-known to the skilled artisan and thus need no further explanation, except to note that thicknesses reported and used herein are reported in angstrom units.

The term "index of refraction" or, synonymously, "refractive index" is a term well understood in the art and is used herein in accordance with this well known meaning. It is defined as:

" . . . the ratio of the velocity of light in a vacuum to its velocity in the substance. It is also the ratio of the sine of the angle of incidence to the sine of the angle of refraction. In general, the index of refraction for any substance varies with the wavelength of the refracted light" [Handbook of Chemistry & Physics, 41st Edition 1959–1960, p. 3099]

This index of refraction is generally designated as "n". Measurement herein of the index of refraction ("n") is carried out, as stated above, using the aforesaid "n & k" analyzer. For purposes of this invention the parameters (i.e. limits) of the refractive index "n" to be employed as a characteristic of the undercoat layer are measured at a wavelength of 550 nm, because this wavelength is generally recognized as the most sensitive to the human eye when viewing a coating system on a glass substrate for optical, color or aesthetic purposes. It is, of course, understood that the refractive index varies with wavelength and that an entire curve is formed as one, for example, plots refractive index vs. wavelength for any given layer. Thus, the choice of 550 nm as the wavelength at which the permissible range of "n" is chosen is simply a manifestation of a point on a curve, such that if the choice of another point on the curve results in a different "n" which falls outside the permissible range for "n", such is still considered to be within the scope of this invention, provided that the "n" on that curve at 550 nm falls within the permissible range and the layer system achieves the other characteristics specified in the claims.

Figure 1A:
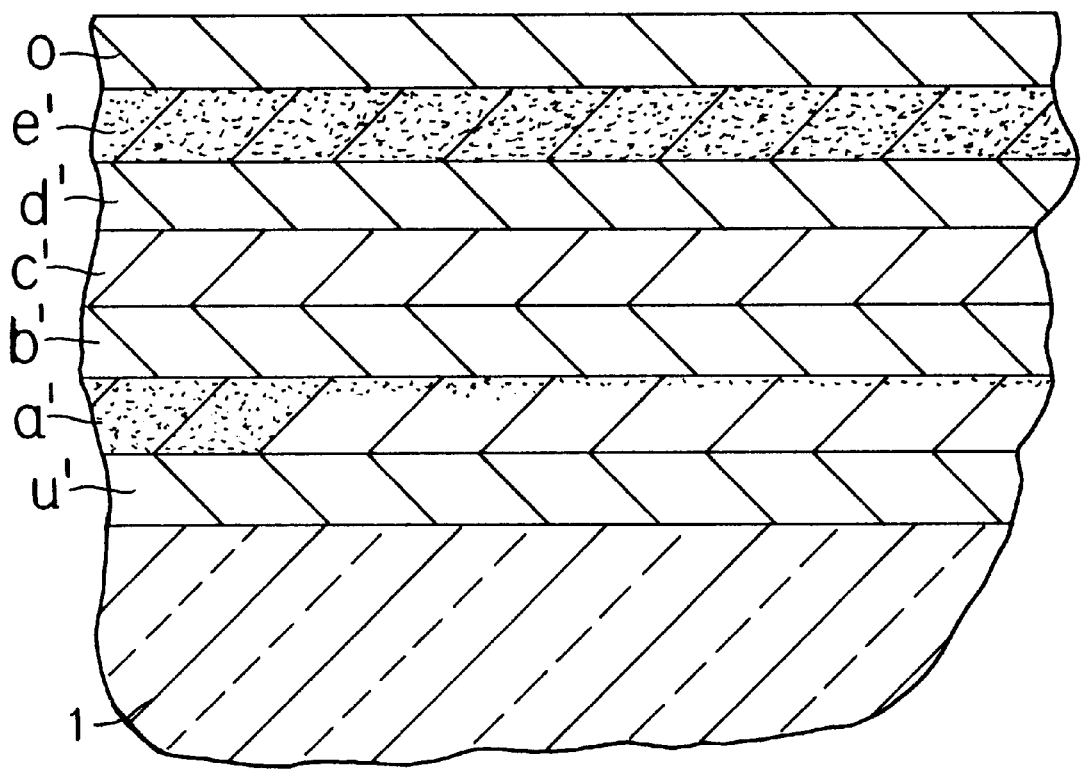
FIG. 1A is a partial side sectional view of another embodiment of a layer system according to this invention.

Turning now to FIGS. 1 and 1A, there is shown a partial cross-sectional sketch of two embodiments of this invention. As can be seen, there is employed a conventional glass substrate 1 used in the architectural art. Such glass is preferably made by the conventional "float" process and thus is referred to as "float glass". The usual thickness thereof may be from about 2 mm–6 mm. The composition of the glass is not critical, and may vary widely. Typically, the glass employed is one of the soda-lime-silica family of glass well-known in the glass art.

The process and apparatus used to form the various layers on glass substrate 1 may be a conventional multi-chamber (multi-target) sputter-coating system such as is produced by Airco, Inc. In this respect, the preferred sputter-coating process for use herein is the same as that disclosed in U.S. Pat. No. 5,344,718, the entire disclosure of which has been previously incorporated herein by reference. It is to be noted here that it is an aspect of this invention that its unique results are achieved through the use of conventional sputter-coating techniques without the need for special processes to relieve intrinsic stresses as reported in U.S. Pat. No. 5,377,045 discussed above, and without the need for expensive cosputtering composite targets (e.g. Si/Zr targets).

Turning first to the layer system shown in FIG. 1, six layers (u)–(e) are employed. From the glass substrate 1 outwardly the layers, and a preferred range of thicknesses, measured by the "n & k" technique above, for this particular embodiment are:

| layer | ingredient | thickness (Å) |
|---|---|---|
| u | transparent dielectric** | about 100–400 |
| a | $Si_3N_4$ | about 20–120 |
| b | nichrome* | about 7–50 |
| c | silver | about 75–225 |
| d | nichrome* | about 7–30 |
| e | $Si_3N_4$ | about 50–600 |

*(e.g. 80/20 Ni/Cr by % weight)
**(e.g. $TiO_2$, $Bi_2O_3$, PbO, or mixtures thereof)

In particularly preferred embodiments, the thicknesses of the layers are:

| layer | thickness (Å) |
|---|---|
| u | about 200–250 |
| a | about 40–60 |
| b | about 7–30 |
| c | about 150–180 |
| d | about 7–15 |
| e | about 400–500 |

In the six (6) layer embodiments represented by FIG. 1, particularly preferred thicknesses of the layers are about:

| layer | thickness (Å) |
|---|---|
| u | 225 |
| a | 50 |
| b | 20 |
| c | 165 |
| d | 7 |
| e | 450 |

In sputter-coating the layers (a) and (e), silicon (Si) targets are employed. Optionally the Si may be admixed with an amount of stainless steel (e.g. #316) to achieve the desired end amount in the film layer. By conducting the sputtering in nitrogen, $Si_3N_4$ is formed and at least some of the chromium in the stainless steel forms chromium nitride if stainless steel is employed. As a further option, aluminum may also be employed as a dopant in small amounts (e.g. 6% by wt.) for the purpose of keeping the target conductive. Stainless steel also serves this purpose.

In this respect, in general, the amount of stainless steel, if optionally employed, is used in an amount of about 0.5%–15% by weight of the layer. Since the sputter process generally involves sputtering the Si, and stainless steel (and Al if optionally present) at approximately the same rate, the amount of each ingredient employed (if reasonably uniformly disbursed) in the target itself may be assumed to be with reasonable accuracy for the purposes of this invention, the resultant amount in the layer after sputter-coating (as confirmed by analysis). Thus when stating herein that a layer includes a certain weight percent of stainless steel, it generally means that it was about that amount that was employed in the target.

Reference is now made to FIG. 1A where a seven (7) layer embodiment of this invention is illustrated. Here the six lower layers (u')–(e') are of the same ingredients as their counterpart layers (u)–(e) in FIG. 1. Added thereto, however, is overcoat layer O of a metal oxide (e.g. $SnO_2$, ZnO, $In_2O_3$ or mixtures thereof) such that the thicknesses of these layers are preferably about:

| layer | thickness (Å) |
|---|---|
| u' | 100–400 |
| a' | 20–120 |
| b' | 7–50 |
| c' | 75–225 |
| d' | 7–30 |
| e' | 50–600 |
| o | 50–500 |

In certain preferred embodiments the layers have about the following thicknesses:

| layer | thickness (Å) |
|---|---|
| u' | 200–250 |
| a' | 40–60 |
| b' | 7–30 |
| c' | 150–180 |
| d' | 7–15 |
| e' | 50–80 |
| o | 300–400 |

In the seven (7) layer embodiments of FIG. 1A, in this respect, particularly preferred thicknesses are about:

| layer | thickness (Å) |
|---|---|
| u' | 225 |
| a' | 50 |
| b' | 20 |
| c' | 165 |
| d' | 7 |
| e' | 55 |
| o | 400 |

The index of refraction of overcoat O is about 1.8–2.2, and preferably 2.0 at a wavelength of 550 nanometers. While it is envisioned that overcoat layer "O" may at times replace a portion of layer e', rather than just be added to it, nevertheless, it has been found that layer e' should be at least 50 Å thick in order to achieve the desired results of this invention.

As stated above, by the specific selection of undercoat "u" so that it has an index of refraction at 550 nm wavelength of about 2.5–2.6 and preferably about 2.52, the use of stainless steel may be eliminated and there will still be provided on the planar surface of a monolithic sheet of glass (e.g. "float glass") having a thickness of about 2 mm–6 mm, a layer system which produces a glass article having a normal emissivity ($E_n$) of about 0.06 or less, a hemispherical emissivity ($E_h$) of about 0.07 or less, a sheet resistance ($R_s$) of about 5.0 ohms/$_{sq.}$ or less and which exhibits a substantially neutral visible reflected color (i.e. from neutral to slightly blue) when viewed from the glass side. By choosing the appropriate thicknesses, the monolithic visible transmittance ($T_{vis}$) is at least about 75%, and as an optional feature the monolithic sheet may be rendered heat treatable as defined above.

A typical range of reflectance and color coordinates for the embodiments of this invention using the thicknesses of monolithic glass sheet and layers as described above, are:

| GLASS SIDE |
| --- |
| $R_GY$, about 8 to 18<br>$a_h$, about −3 to +3<br>$b_h$, about 0 to −15 |
| FILM SIDE |
| $R_FY$, about 4 to 15<br>$a_h$, about 0 to +8<br>$b_h$, about −5 to −20 |

In preferred embodiments such characteristics are:

| GLASS SIDE |
| --- |
| $R_GY$, about 9 to 15<br>$a_h$, about −1 to +3<br>$b_h$, about −2 to −10 |
| FILM SIDE |
| $R_FY$, about 4 to 10<br>$a_h$, about +3 to +7<br>$b_h$, about −8 to −20 |

In the embodiments of FIG. 1 when the particularly preferred thicknesses above set forth for this six (6) layer or the seven (7) layer embodiment are employed, the reflectance and color coordinates are:

| GLASS SIDE |
| --- |
| $R_GY$, about 13.1<br>$a_h$, about 1.4<br>$b_h$, about −4.0 |
| FILM SIDE |
| $R_FY$, about 8.6<br>$a_h$, about 4.7<br>$b_h$, about −12.2 |

Such a monolithic glass sheet so produced from clear float glass, and having either the six (6) or seven (7) layer system thereon has been found to have a monolithic visible transmittance ($T_{vis}$) of at least about 75%, and more preferably at least about 76%. In both instances the layer system has been found to be heat treatable, mechanically durable, and chemically durable.

As stated above, it is a unique finding of the subject invention that the above characteristics can be achieved even though stainless steel is not employed, provided that the index of refraction (n) of undercoat layer u or u' at 550 nm wavelength is about 2.5–2.6, and preferably 2.52. While any suitable transparent dielectric material having this characteristic, and not otherwise interfering with the other desired results of this invention, may be used, such as $Bi_2O_3$, PbO, or mixtures thereof, a particularly preferred material is $TiO_2$.

The index of refraction of $TiO_2$ sputtered from a Ti target has been found to vary considerably, and at times well beyond the rather narrow range found useful in the practice of this invention, depending upon the amount of oxygen employed during the sputtering process. Thus, through careful control of the oxygen content in the sputter coater zone for $TiO_2$, the particular type of $TiO_2$ with the requisite refractive index (n) may be achieved.

Any significant variance from this range (and thus the type $TiO_2$ achieved by inadequate $O_2$ control) results in undesirable characteristics in the ultimate product. In this respect, it has been found that a ratio (by % volume, $O_2$:Ar) of oxygen ($O_2$) to inert gas (e.g. Argon) of about 55:45 to 49:51, and preferably 49% $O_2$ to 51% Ar (i.e. the lower limit), during a typical sputter-coating operation (e.g. FIG. 5) will yield a $TiO_2$ (i.e. an oxide of titanium) falling within the desired range of refractive index ("n") as contemplated by this invention. In this respect, it has been found that going below 49% $O_2$ results in a layer system whose monolithic visible transmittance ($T_{vis}$) is significantly below 75% (e.g. it has been found that at 48% $O_2$, n=0.14 and the $T_{vis}$ is less than 3%). It has also been found that this lower limit is rather sharp (abrupt), and that no oxygen limit below this 49% can truly be tolerated at the power levels being employed (e.g. approx. 105 kw per tube). A similar, but less abrupt, phenomenon occurs at the upper level of $O_2$ (i.e. 55%). [It has been found that at 56% $O_2$, n=2.46, the $T_{Vis}$ became 73.5%, and the color became unacceptably purple.]

As referenced above, FIG. 2 illustrates, somewhat schematically, a typical IG unit in accordance with this invention. In order to differentiate the "inside" of the IG unit labelled "In" from its "outside" labelled "Out", the sun 9 is schematically presented. As can be seen such an IG unit is made up of "outside" glass pane 11 and "inside" glass pane 13. These two glass panes (e.g. 2 mm–6 mm thick) are sealed at their peripheral edges by a conventional sealant 15 and desiccant strip 17. The panes are then retained in a conventional window or door retaining frame 19 (shown in partial schematic form). By sealing the peripheral edges of the glass sheets and replacing the air in chamber 20 with a gas such as argon, a typical, high insulating value IG is formed. Chamber 20 in this respect is typically about ½" in width.

By employing the layer systems of this invention, as above-described, as layer system 22 on wall (i.e. inner planar surface) 24 of outside glass sheet 11 within the chamber 20, as illustrated, or alternatively on wall (i.e. inner planar surface) 26 of the inside glass sheet 13 within chamber 20 (not shown), a particularly unique, non-mirror-like IG unit is formed which is substantially neutral in color when viewed from either the inside or outside of the dwelling in which the IG unit is installed. In this respect, it is understood, of course, that FIG. 2 illustrates only one embodiment of an IG unit in which the unique layer systems of this invention may be employed. In fact, the layer systems of this invention are available for use in a wide variety of IG units generally, including those having more than two panes of glass. Generally speaking, however, the IG units of the subject invention, when the layer system is located on the wall of either glass sheet within an insulating chamber of the IG unit, will typically have the following range of characteristics:

TABLE 1

| Performance<br>Characteristics | Wall 24 | | Wall 26 | |
| --- | --- | --- | --- | --- |
|  | Range | Preferred | Range | Preferred |
| Visible Transmittance (%) | ≧65 | 69 | ≧65 | 69 |
| Reflection (%, visible, outside) | 14–20 | 17 | 11–18 | 13 |
| Reflection (%, visible inside) | 11–18 | 13 | 14–20 | 17 |

TABLE 1-continued

|  | Wall 24 | | Wall 26 | |
| --- | --- | --- | --- | --- |
| Performance Characteristics | Range | Preferred | Range | Preferred |
| Shading coefficient (S.C.) | 0.45–0.60 | 0.53 | 0.55–0.69 | 0.63 |
| Solar heat gain coefficient | 0.38–0.58 | 0.45 | 0.47–0.60 | 0.55 |
| U (Winter) [BTU/ft$^2$/hr/°F.] | 0.23–0.28 | 0.25 | 0.23–0.28 | 0.25 |
| U (Summer) [BTU/ft$^2$/hr/°F.] | 0.23–0.28 | 0.25 | 0.23–0.28 | 0.25 |
| Relative heat gain [BTU/ft$^2$/hr/°F.] | 90–120 | 110 | 110–150 | 130 |

In this respect, in certain embodiments typical reflectance and color coordinates will fall within the following range when viewed from the outside or inside:

| OUTSIDE | INSIDE |
| --- | --- |
| R$_G$Y about 14 to 20 | R$_f$Y about 11 to 18 |
| a$_h$ about −2 to +2 | a$_h$ about 0 to +4 |
| b$_h$ about 0 to −10 | b$_h$ about 0 to −10 | and the visible transmittance is at least 65% and preferably at least 69%.

In addition to the above characteristics, in certain preferred embodiments where the aforesaid six layer system represented by FIG. 1 (using the particularly preferred thickness listed above), the following performance characteristics are achieved if such a system is used in an IG unit with a ½" wide chamber 20 filled with Argon as those characteristics are computed according to the software program known as "WINDOW 4.1" from Lawrence Berkley Laboratories of Berkeley, Calif.; and, in addition, using a Hitachi spectrophotometer to get input data for: (1) visible and solar transmittance; (2) solar reflection, film side and glass side; and (3) a Beckman infrared spectrophotometer to measure emittance. The WINDOW 4.1 program, 1988–1994 is a copyrighted program of the Regents of the University of California entitled "Fenestration Production Thermal Analysis Program."

TABLE 2

| Performance Characteristic | Wall 24 | Wall 26 |
| --- | --- | --- |
| T$_{visible}$ | 69 | 69 |
| R$_{vis.,}$ outside | 17 | 14 |
| R$_{vis.,}$ inside | 14 | 17 |
| T$_{solar}$ | 42 | 42 |
| R$_{solar}$ | 34 | 35 |
| Shading coeff. | 0.53 | 0.64 |
| Solar heat gain coeff. | 0.45 | 0.55 |
| U$_{Winter}$ | 0.25 | 0.25 |
| U$_{Summer}$ | 0.25 | 0.25 |
| E$_n$ | 0.05 | 0.05 |
| E$_h$ | 0.06 | 0.06 |
| Relative heat gain | 109 | 131 |

Color (monolithic sheet, Hunter Ill. C 10° observer)

| Ty | 75.11 |
| --- | --- |
| a$_h$ | −2.9 |
| b$_h$ | +1.6 |
| R$_G$Y (outside) | 13.1 |
| a$_h$ | 1.4 |
| b$_h$ | −4.0 |
| R$_f$Y (inside) | 8.6 |
| a$_h$ | 4.7 |
| b$_h$ | −12.2 |
| R$_s$(ohms/sq.) | 4.66 |

In like manner using the same technique of measurement, the following performance characteristics are achieved in the aforesaid system when the seven layer system represented by FIG. 1A (using the particularly preferred thicknesses listed above) is the layer system on either Wall 24 or Wall 26 (FIG. 2) as noted below:

TABLE 3

| Performance Characteristic | Wall 24 | Wall 26 |
| --- | --- | --- |
| T$_{visible}$ | 69 | 69 |
| R$_{vis.,}$ outside | 17 | 14 |
| R$_{vis.,}$ inside | 14 | 17 |
| T$_{solar}$ | 42 | 42 |
| R$_{solar}$ | 34 | 35 |
| Shading coeff. | 0.53 | 0.64 |
| Solar heat gain coeff. | 0.45 | 0.55 |
| U$_{Winter}$ | 0.25 | 0.25 |
| U$_{Summer}$ | 0.25 | 0.25 |
| E$_n$ | 0.05 | 0.05 |
| E$_h$ | 0.06 | 0.06 |
| Relative heat gain | 109 | 131 |

Color (monolithic sheet, Hunter Ill. C 10° observer)

| Ty | 75.11 |
| --- | --- |
| a$_h$ | −2.9 |
| b$_h$ | 1.6 |
| R$_G$Y (outside) | 13.1 |
| a$_h$ | 1.4 |
| b$_h$ | −4.0 |
| R$_f$Y (inside) | 8.6 |
| a$_h$ | 4.7 |
| b$_h$ | −12.2 |
| R$_s$(ohms/sq.) | 4.66 |

In both these embodiments, the monolithic glass sheet may be subjected to both the boil test to determine chemical durability and the aforesaid Pacific Scientific Abrasion tester to determine mechanical durability. Both tests are passed for both embodiments.

SPECIFIC EXAMPLES

A five (5) zone G-49 Airco coater as is illustrated in FIG. 5 herein and whose operation is generally described in U.S. Pat. No. 5,425,861 is employed to form various layer systems for the purpose of illustrating this invention and the importance of the selection of an index of refraction falling within the above-described range for the undercoat layer (e.g. u or u' in FIGS. 1 and 1A, respectively).

In order to form a six layer system (e.g. the stack as illustrated in FIG. 1) the following target and atmospheric system is established for the zones (and targets therein) as illustrated in FIG. 5. A monolithic, clear glass sheet of conventional soda-lime-silica float glass having a thickness of 0.087 inches is employed for convenience.
(Six Layer System—FIG. 1) [Line Speed, 205 in./min.]

| Target #'s | Layer | Coat Zone | Total kW | Average Voltage | Average Current | Average kW | Argon sccm | Oxygen sccm | Nitrogen sccm | Pressure Torr |
|---|---|---|---|---|---|---|---|---|---|---|
| 1–6 | $TiO_2$ | 1 | 584 | 520 | 185 | 96.5 | 1,127 | 887 | | $3.6 \times 10^{-3}$ |
| 7–12 | $TiO_2$ | 2 | 573.0 | 520 | 185 | 96.5 | 1,120 | 1,119 | | $2.9 \times 10^{-3}$ |
| 13–18 | $Si_3N_4$ | 3 | 39.5 | 425 | 15.5 | 6.58 | 350 | | 1,568 | $2.0 \times 10^{-3}$ |
| P1 | NiCr—N | 4 | 1.68 | 378 | 4.4 | 1.68 | | | | |
| P2 | Ag | 4 | 12.71 | 425 | 29.90 | 12.71 | 510 | | 530 | $1.5 \times 10^{-3}$ |
| P3 | NiCr—N | 4 | 2.51 | 511 | 4.81 | 2.51 | | | | |
| 25–30 | $Si_3N_4$ | 5 | 282.2 | 478 | 98.4 | 47.1 | 347 | | 1,600 | $2.2 \times 10^{-3}$ |

The thicknesses, measured by the "n & k" technique above-described, are:

Six Layer System—FIG. 1

| Layer | (Å) |
|---|---|
| U | 225 |
| a | 50 |
| b | 20 |
| c | 166 |
| d | 7 |
| e | 450 |

The optical and electrical properties of this six layer system is as follows:

Six Layer System—FIG. 1

| Glass Side | | Film Side | |
|---|---|---|---|
| $R_GY$, | 12.97 | $R_fY$, | 8.50 |
| $a_h$, | 2.31 | $a_h$, | +6.03 |
| $b_h$, | -5.98 | $b_h$, | -16.17 |
| $T_{vis.}$, | 75.36 | | |
| $a_h$, | -3.57 | | |
| $b_h$, | 2.3 | | |
| Electrical | | | |
| $R_s$, | 4.72 (ohms/sq.) | | |
| $E_n$, | 0.056 | | |
| $E_h$, | 0.066 | | |

This six (6) layer system, as above-described, is formed into an IG unit of the type shown in FIG. 2 (coating on Wall 24, ½" Argon insulating chamber or vacuum chamber). Its optical, thermal and electrical properties (by applying the above-described WINDOW 4.1 technique) are:

| $RY_{outside}$, | 17.41 |
|---|---|
| $a_h$ | -0.05 |
| $b_h$ | -2.28 |
| $RY_{inside}$, | 13.79 |
| $a_n$ | 1.65 |
| $b_h$ | -5.71 |
| $T_{Vis}$ | 69.1 |
| $a_h$ | -2.97 |
| $b_h$ | +0.39 |
| Winter U-value | (Argon chamber) | 0.25 |
| | (vacuum chamber) | 0.05 |
| R value | (Argon chamber) | 4.0 |
| | (vacuum chamber) | 20 |
| Shading Coefficient | | 0.53 |
| $R_s$ | | 4.66 |
| $E_n$ | | 0.05 |
| $E_h$ | | 0.06 |

By way of further comparison, and in contrast to the characteristics of the above six layer embodiment of this invention are the following characteristics by applying the above-described WINDOW 4.1 technique (½" Argon chamber) to the aforesaid prior art commercial IG product "Cardinal-171".

TABLE 4

| Performance Characteristic | Wall 24 | Wall 26 |
|---|---|---|
| $T_{visible}$ | 73 | 73 |
| $R_{vis.,\ outside}$ | 11 | 12 |
| $R_{vis.,\ inside}$ | 12 | 11 |
| $T_{solar}$ | 41 | 41 |
| $R_{solar}$ | 33 | 36 |
| Shading coeff. | 0.52 | 0.62 |
| Solar heat gain coeff. | 0.443 | 0.531 |
| $U_{Winter}$ | 0.25 | 0.25 |
| $U_{Summer}$ | 0.24 | 0.24 |
| $E_n$ | 0.051 | 0.051 |
| $E_h$ | 0.060 | 0.060 |
| Relative heat gain | 106 | 127 |
| $R_s$ (ohms/$_{sq.}$) | 3.27 | 3.27 |

Color (h) Hunter, Ill. C 10° Observer (monolithic sheet)
Ty, 80.7
$a_h$, -1.26
$b_h$, +2.62
$R_GY$, 5.98
$a_h$, +2.37
$b_h$, -5.68
$R_FY$, 4.90
$a_h$, -2.01
$b_h$, 0.60

It is to be pointed out, in this respect, that this Cardinal-171 IG product has achieved significant commercial acceptability in the marketplace. Its only real drawback is its lack of chemical durability. Its precise layer stack system is not known. However, it is believed to be consistent with that as taught in the aforesaid U.S. Pat. No. 5,302,449.

As can be seen, by comparing the results of this invention with those of this already commercially accepted product, the subject invention has achieved a high level of competitiveness using a significantly different and less expensive layering system.

With respect to the above-referenced IG performance characteristics not previously defined herein, such as $U_{Winter}$, R value etc., those terms are well understood in the art and are used here in accordance with their accepted meaning. For example, the "U" value is a measure of the insulating property of the IG system. $U_{Winter}$ and $U_{Summer}$ are determined according to NFRC 100-91 (1991), a standard subsumed in the WINDOW 4.1 software. "Shading coefficient" ("S.C.") is determined in accordance with NFRC 200-93 (1993), by first determining "Solar heat gain coefficient" and dividing by 0.87. "Relative heat gain" (r.h.g.) is determined by this same NFRC 200-93 procedure. "$T_{solar}$" means total solar energy transmittance, a known combination of UV, visible and IR transmittance. "$R_{solar}$" similarly, means total solar reflectance, a known combination of UV, visible, and IR reflectance.

FIG. 3 is a partial schematic view of a typical family dwelling 28 having various portals in which the subject invention may be employed. For example, window 30 may employ either a monolithic sheet of glass having a layer stack of this invention thereon, or employ as a "storm window" an IG unit of this invention such as is illustrated in FIG. 2. Similarly, sliding wall panel 32 or non-sliding wall panel 34 as well as front door panel 36 may be so constructed by employing this invention, either as a monolithic glass sheet or as an IG unit.

FIG. 4 is a schematic illustration of a typical two-pane IG unit stack prior to sealing. In certain embodiments of this invention, as stated above, the layer systems are heat treatable. In this Figure, the prestack employs two typical, clear float glass sheets 31 and 33 separated a selected distance (e.g. 0.1 mm) by glass beads 35. Lower sheet 33, of slightly larger size than upper sheet 31, has a layer system 37 according to this invention sputter-coated onto its inner planar surface (optionally, the inner planar surface of sheet 31 may be used for the layer coating). A conventional sealant 39 (e.g. a low melting ceramic) is then provided in the peripheral area 41 defined by centering the smaller sheet 31 on the larger sheet 33.

In conventional fashion, sufficient heat (e.g. approx. 500° C.) is applied to flow sealant 39 to thereby create an insulating chamber 43. During this process a vacuum is applied to remove as much air and water vapor as is economically feasible, and optionally to either leave a vacuum or replace the air and water vapor with an inert gas such as Argon. In an alternative technique the edges of the glass are flame sealed, rather than using a sealant. In either instance, heat must be applied to create the seal and drive off the water vapor. Thus the heat treatable embodiments of this invention find unique applicability in IG units of the type shown in FIG. 4 wherein the layer system must be able to withstand the heat employed during sealing without adversely affecting its desired characteristics.

In yet another alternative, a vacuum process is not employed and a spacing of ½" for the chamber is effected by various known, conventional techniques. In such a process the insulating chamber is usually filled with Argon so as to displace the air and any water vapor (i.e. humidity or moisture) that might be present.

Once given the above disclosure many other features, modifications and improvements will become apparent to the skilled artisan. Such other features, modifications and improvements are therefore considered to be a part of this invention, the scope of which is to be determined by the following claims:

We claim:

1. In a method of making an insulating glass unit comprised of at least two sheets of glass sealed at their peripheral edges to each other thereby to define at least one insulating chamber therebetween, said method including the steps of spacing said glass sheets apart, heating said sheets at an elevated temperature, and sealing the peripheral edges of said sheets to each other at or above said elevated temperature, the improvement comprising using as at least one of said glass sheets, a glass sheet having on a surface thereof and extending outwardly therefrom, a layer system including:

a) a layer of a transparent dielectric material having an index of refraction (n) of about 2.5–2.6 as measured at a wavelength of 550 nanometers;

b) a layer of $Si_3N_4$;

c) a layer of nichrome;

d) a layer of silver;

e) a layer of nichrome; and f) a layer of $Si_3N_4$, and wherein when said glass sheet has a thickness of about 2 mm–6 mm and wherein said layers are of sufficient thicknesses such that said coated glass sheet has a normal emissivity ($E_n$) of about 0.06 or less, a hemispherical emissivity ($E_h$) of about 0.07 or less, a sheet resistance ($R_s$) of about 5.0 ohms/sq. or less and having a substantially neutral visible reflected color when viewed from the glass side.

2. In a method according to claim 1 wherein said glass sheet having said layer system thereon is heat treatable.

3. In a method according to claim 1 wherein said layer (a) consists essentially of $TiO_2$ and the layers have about the following thicknesses:

| Layer | Thickness Å |
|-------|-------------|
| a | 225 |
| b | 50 |
| c | 20 |
| d | 165 |
| e | 7 |
| f | 450 | and wherein the glass sheet having said layer system thereon has the following characteristics:

| GLASS SIDE |
|---|
| $R_GY$ is about 13.1 |
| $a_h$ is about 1.4 |
| $b_h$ is about −4.0 |

| FILM SIDE |
|---|
| $R_fY$ is about 8.6 |
| $a_h$ is about 4.7 |
| $b_h$ is about −12.2 | wherein RY is the reflectance and $a_h$ and $b_h$ are the color coordinates as measured in Hunter units, Ill. C, 10° observer, and wherein said layer system is mechanically and chemically durable and has a visible transmittance of about 76%.

4. In a method according to claim 3 wherein said sheet having said layer system thereon is heat treatable.

* * * * *

UNITED STATES PATENT AND TRADEMARK OFFICE
CERTIFICATE OF CORRECTION

PATENT NO.   : 6,059,909
DATED        : May 9, 2000
INVENTOR(S)  : Klaus W. Hartig, Steve L. Larson and Philip J. Lingle It is certified that error appears in the above-identified patent and that said Letters Patent is hereby corrected as shown below:

Column 10, line 15, delete ""IF"" after "i.e." and substitute --"F"--.

Column 13, line 65, delete "0" (zero) after "layer" and substitute -- O --.

Signed and Sealed this

Twenty-seventh Day of March, 2001

*Attest:*

*Attesting Officer*

NICHOLAS P. GODICI

Acting Director of the United States Patent and Trademark Office